United States Patent [19]
Stoutenberg

[11] 3,990,134
[45] Nov. 9, 1976

[54] SHEET METAL FILE
[75] Inventor: Carl Christian Stoutenberg, Avon, Conn.
[73] Assignee: The Stanley Works, New Britain, Conn.
[22] Filed: Dec. 17, 1975
[21] Appl. No.: 641,688

[52] U.S. Cl. .................................. 29/78; 29/80; 76/101 SM
[51] Int. Cl.² ........................................ B23D 71/04
[58] Field of Search ............... 29/80, 78; 76/36, 88, 76/101 SM

[56] References Cited
UNITED STATES PATENTS

| 643,717 | 2/1900 | Ingalsbe | 29/80 |
| 1,831,590 | 11/1931 | Ferguson | 29/80 |
| 3,531,841 | 10/1970 | McCord | 29/80 |
| 3,583,107 | 6/1971 | Benis et al. | 76/101 SM |
| 3,815,190 | 6/1974 | Russell et al. | 29/78 |

FOREIGN PATENTS OR APPLICATIONS

| 54,536 | 11/1916 | Germany | 29/78 |

Primary Examiner—Leonidas Vlachos
Attorney, Agent, or Firm—Prutzman, Hayes, Kalb & Chilton

[57] ABSTRACT

This invention relates to sheet metal files of the type having a large number of discrete cutting edges projecting from the surface of an elongated strip of thin sheet metal forming the base of the file. In such a file, the depth of the cut by each individual cutting edge is very small and accordingly, the pressure on each cutting edge is small and the base of the file need only have sufficient strength and rigidity to support the edge and apply the necessary small cutting pressure. The cutting edges are formed by partially shearing tabs or teeth from the solid strip forming the base and bending them out of the plane of the base at an acute angle. The ends of the teeth are sharpened and hardened to form the discrete cutting edges having the desired rake and clearance angle. The tabs or teeth are generally disposed in parallel rows which extend laterally and non-perpendicularly with respect to the longitudinal axis of the file with the cutting edges in adjacent rows being laterally offset with respect to each other.

7 Claims, 3 Drawing Figures

U.S. Patent    Nov. 9, 1976    3,990,134
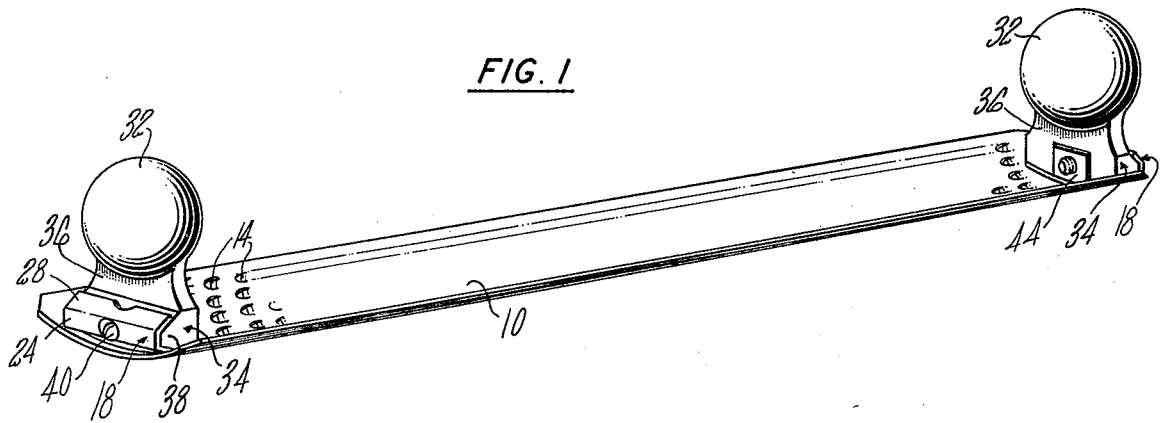
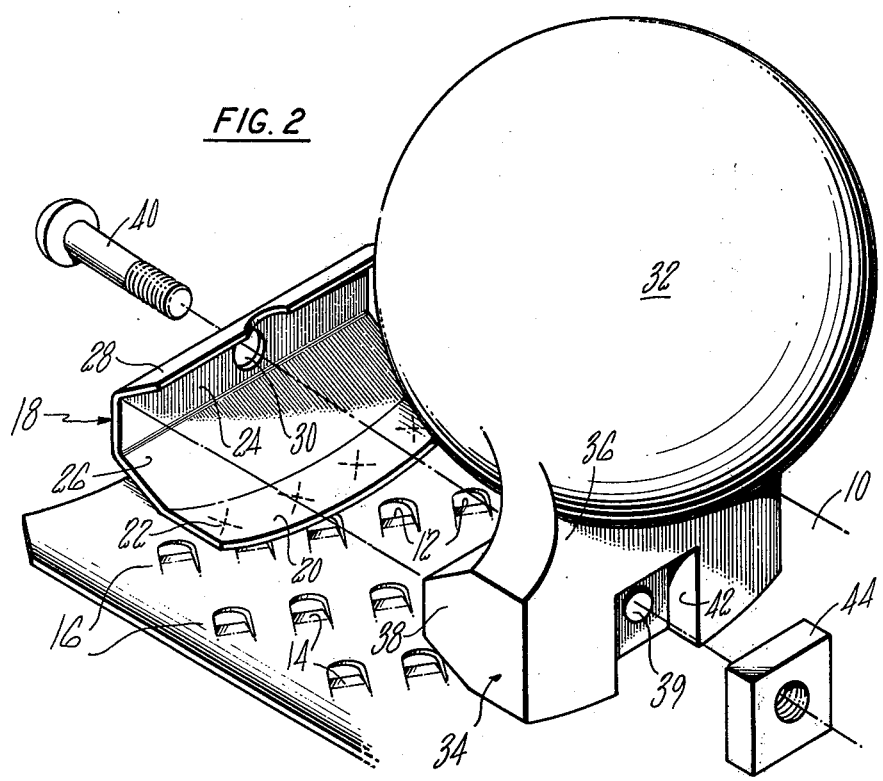
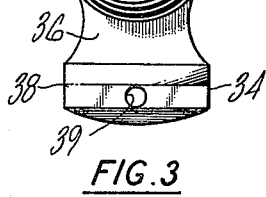

SHEET METAL FILE

The present invention has for its principal object the provision of an improved means for providing grips for a sheet metal file. Included in this object is the provision of such a file wherein the grips are inexpensive, secure in use, and easy to install despite manufacturing variations and tolerances.

Other objects will be in part obvious and in part pointed out more in detail hereinafter.

A better understanding of the invention will be obtained from the following detailed description and the accompanying drawing of an illustrative application of the invention.

In the drawing:

FIG. 1 is a perspective view of the assembled sheet metal file of this invention;

FIG. 2 is a fragmentary enlarged exploded perspective view thereof; and

FIG. 3 is an end view of the grip of this invention.

Referring now to the drawings, as shown in FIG. 1, the assembled sheet metal file has a base 10 formed of a length of sheet metal having a plurality of discrete cutting edges 12 formed at the ends of the teeth 14 partially severed and projecting at an acute angle from the surface of the base 10.

As shown, these teeth project perpendicularly along a plurality of rows 16 of teeth 14 with the rows being disposed at an acute angle to the longitudinal axis of the base 10. The cutting edges 12 of the teeth 14 in adjacent rows are shown as being staggered from row to row so that the longitudinal movement of the file will result in the cutting edges engage the entire surface of the workpiece. The base 10 is concavo-convex in lateral cross-section to impart longitudinal rigidity thereto.

As shown, a clip 18 extends laterally of the base adjacent each end of the file and is secured to the concave surface of base 10 of the file. Each clip 18 is provided with a base flange 20 having a convex surface mating the concave surface of the base and is shown as being secured thereto as by spot-welds 22. Each clip 18 is further provided with an end wall 24 disposed at right angles to the base flange 20 and is connected to the base flange 20 by a web 26 and terminates in a reversely turned top flange 28. As will be apparent from the drawings, the angles between the web 26 of base flange 20, end wall 24, and top flange 28 are all obtuse angles. The end wall 24 has a central aperture 30 to receive a fastening screw as illustrated in FIG. 2.

The sheet metal file includes a pair of identical hand grips each terminating at the top with the ball 32 which may be firmly and comfortably grasped by the user and a base 34 connected to the ball 32 by intervening upstanding web 36 to space the ball from the base 10 of the file. The base 34 of each grip is provided with a laterally extending projection 38 which is shaped to conform with the recess formed by the end wall 24, top flange 28 and web 26 of the end clip 18 and has a length which is essentially coextensive with that of the clip 18. With the projection 38 snugly nested in the recess formed by the clip 18, the fastening screw 40 is passed through the aperture 30 of the end wall 24 of the clip and the aligned aperture 39 through the base 34 of the hand grip. The opposite wall of the base 34 of the hand grip is provided with a square recess 42 to flush mount the nut 44 so that it is not exposed to scrape the knuckles of the user. When the screw 40 is tightened, the projection 38 on the base 34 of the hand grip is closely nested within the recess of the clip 18 due to their matching shapes to provide a secure connection wherein the grips may be quickly and easily attached and removed from a blade while being spaced above the concave surface of the base 10 of the file for comfortable use. Moreover, since the hand grips are not connected to one another, they may be readily assembled on the blade despite variations in the lengths of the file or in the spacing between the clip 18 on the base 10 of the file.

As will be apparent to persons skilled in the art, various modifications, adaptations and variations of the foregoing specific disclosure can be made without departing from the teachings of the present invention.

I claim:

1. A sheet metal file comprising an elongated sheet metal base having a plurality of teeth projecting from one side of the base, a clip secured to and projecting from the other side of the base adjacent each end of the file and being shaped to define a laterally extending recess spaced above the base, a hand grip mounted by each clip, with each hand grip having a base providing a laterally extending projection shaped to conform to the associated recess and being nested therein, said projection being substantially the same length as the recess, said clip and said projection each being apertured, and a fastener received therein to rigidly clamp each clip and hand grip.

2. The sheet metal file of claim 1 wherein the elongated sheet metal base is concavo-convex in cross-section and the clips are secured on the concave side.

3. The sheet metal file as recited in claim 2 wherein the grips comprise a ball connected to the base of the grip by an intervening web and said base is provided with a recess for receiving a flush mounted nut for the fastener.

4. The sheet metal file of claim 1 wherein each clip is provided with a base flange welded to the elongated sheet metal base of the file and has an end wall terminating in a top flange and connected to the base flange to form the recess, the angles between the base flange, end wall and top flange being obtuse angles.

5. The sheet metal file of claim 4 wherein the recesses defined by the clips face each other.

6. A sheet metal file suited for use with a pair of removable hand grips having an apertured base provided with a laterally extending projection, said file comprising an elongated sheet metal base having a concavo-convex cross-section and a plurality of teeth projecting from one side thereof, a clip projecting from the concave side of the base at each end of the file, each clip having a base flange permanently secured to the base and an end wall terminating in a top flange, said top flange and end wall being joined together at an obtuse angle to form a recess with the bottom wall, the end wall being apertured at its midpoint to receive a fastener for rigidly clamping the clip to the laterally extending projection of a hand grip nested in the recess.

7. The sheet metal file of claim 5 wherein the recesses of the clips of the file face each other.

\* \* \* \* \*